United States Patent [19]

Masuzawa

[11] Patent Number: 5,242,556
[45] Date of Patent: Sep. 7, 1993

[54] ELECTROLYTIC MACHINING USING PULSED ELECTRIC CURRENT

[75] Inventor: Takahisa Masuzawa, Kamakura, Japan

[73] Assignee: Yoshida Kogyo K.K., Tokyo, Japan

[21] Appl. No.: 696,120

[22] Filed: May 6, 1991

[30] Foreign Application Priority Data

May 9, 1990 [JP] Japan .................. 2-117637

[51] Int. Cl.$^5$ ............................................ B23H 3/00
[52] U.S. Cl. ............................ 204/129.43; 204/129.5; 204/129.7; 204/129.75; 204/DIG. 9
[58] Field of Search ............ 204/129.5, 129.43, 129.7, 204/224 M, 225, 228, 129.75, DIG. 9

[56] References Cited

U.S. PATENT DOCUMENTS

| | | | |
|---|---|---|---|
| 3,616,346 | 10/1971 | Inoue | 204/129.43 X |
| 3,654,116 | 4/1972 | Inoue | 204/129.43 |
| 4,097,710 | 6/1978 | Maillet | 204/129.43 X |
| 4,842,702 | 6/1989 | Kuwabara et al. | 204/129.43 X |

FOREIGN PATENT DOCUMENTS 2015244 4/1970 France .
1-27815 1/1989 Japan .

*Primary Examiner*—Donald R. Valentine
*Attorney, Agent, or Firm*—Hill, Steadman & Simpson

[57] ABSTRACT

The invention relates to a method of electrolytically machining the surface of a workpiece by applying positive and negative electric current pulses alternately and repeatedly across the workpiece and a tooling electrode located oppositely in a neutral electrolyte so as to keep a predetermined gap therebetween, wherein the time interval from a negative pulse to a positive pulse is shorter than that from the positive pulse to the next positive pulse. The invention also relates to an apparatus for attaining the method comprising: a device for supporting the workpiece in an electrolytic machining tank; a device for supporting an electrode opposite to the workpiece so as to keep the gap; a power supply means for repeatedly applying across the workpiece and the electrode an electric current waveform wherein its polarity changes alternately and the time interval from a negative pulse to a positive pulse is shorter than that from the positive pulse to the next negative pulse; a device for supplying an electrolyte between the workpiece and the electrode; and a control system for controlling the workpiece fixing device, the electrode supporting device, the power supply means and the electrolyte supplying device.

2 Claims, 8 Drawing Sheets

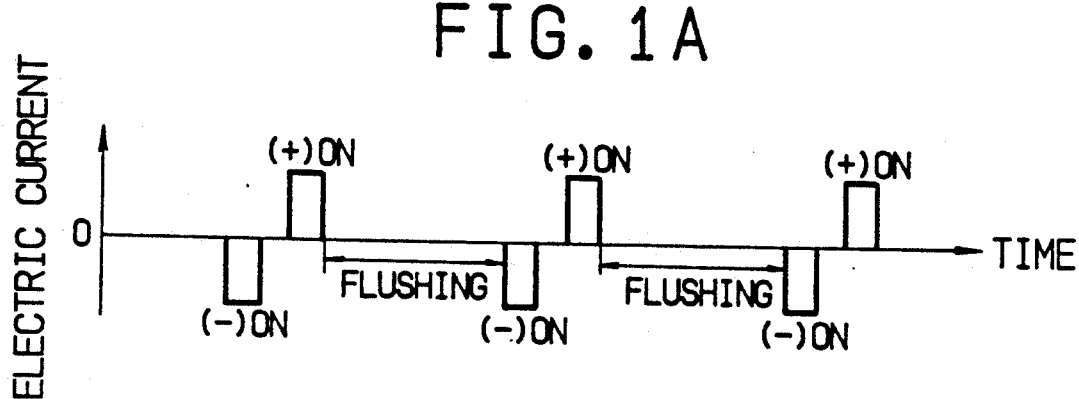
FIG. 1A
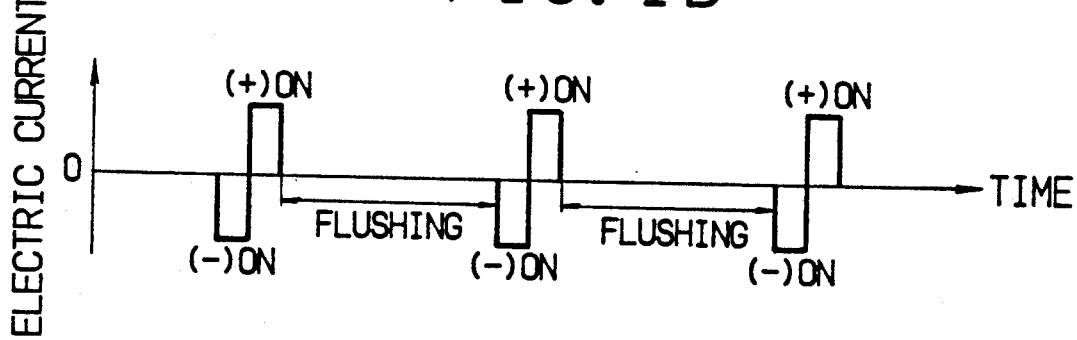
FIG. 1B
FIG. 1C
THE PRIOR ART
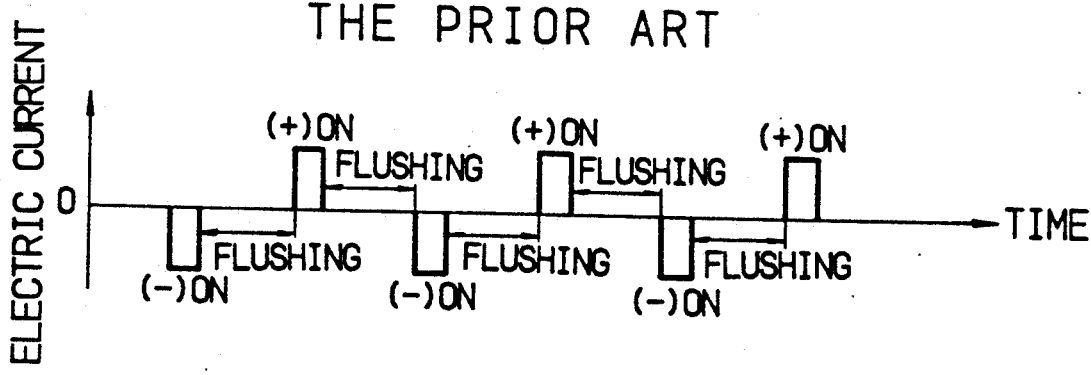

ELECTROLYTIC MACHINING USING PULSED ELECTRIC CURRENT

BACKGROUND OF THE INVENTION

1. Field of the Invention

This invention relates to a method of electrolytically machining a workpiece, in particular a workpiece made of a hard metal using a pulsed electric current based on the principle of electrolysis, and also an apparatus for attaining the method.

2. Description of the prior art

The electrical discharge machining process is used mainly for molding molds having irregular shape. The surface of a workpiece to be subjected to electrical discharge machining is a congregation of minute craters whose surface roughness is about 5 $\mu$m R max or more, in general, under normal finished condition. Further, since the surfaces of workpieces to be subjected to electrical discharge machining have a large number of minute cracks, if mold parts having such surfaces are put to use, the cracks will grow due to loading and thermal shock exerted thereto, resulting in failure or damage thereof. Therefore, the mold parts subjected to electrical discharge machining require, in most cases, improvement of surface roughness thereof and removal of layers which changed in properties due to electrical discharge machining and which contain a large number of minute cracks.

For removing such layers whose properties were changed due to electrical discharge machining, lapping and electrolytic finishing have heretofore been applied.

Because of irregular or complicated shapes of mold parts to be finished, the lapping process has heretofore been conducted manually in most cases, and disadvantageous in that this operation must be done by skilled workers for a long time. Whilst, electrolytic finishing process is very effective as compared with the lapping process, since it can be carried out by subjecting the surface of a workpiece whose shape has been created by electrical discharge machining to electrolytic machining to some degree; that is, eluting the surface of the workpiece electrolytically so that the surface layers whose properties were changed due to the electrical discharge machining can be removed, and at the same time the surface roughness thereof can be improved. In the case of electrolytic finishing work using single polarity pulses, however, it is possible to process or work most of metals including iron by using a workpiece as anode and a tooling electrode as cathode and applying an electric current across them in a neutral electrolyte (which is normally an aqueous solution containing sodium nitrate). However, in case hard alloys containing a great deal of WC or TiC particles are subjected to electrolytic finishing, because Co which is a binder elutes into the aqueous solution, but WC or TiC forms a film of WO$_3$ or TiO$_2$ on the surface of the workpiece, it is impossible to proceed working of them. For this reason, electrolytic finishing alloys is carried out effectively in an aqueous solution containing NaOH which has a property to elute WO$_3$ or TiO$_2$. However, the aqueous solution containing NaOH shows an intense alkalinity and is harmful to the workpiece, and therefore it is rather unsuitable for practical application.

To eliminate such a disadvantage, it has been proposed to conduct electrolytic finishing of a hard alloy in an aqueous solution containing sodium nitrate using alternating current. According to this method, the polarities of the workpiece and the tooling electrode are reversed alternately so that Na$^+$ ions gather on the surface of the cathode and react with water to form a layer of an aqueous solution containing NaOH to thereby enable electrolytic finishing of the hard alloy to be proceeded, so that the surface of the workpiece can be finished considerably satisfactorily. However, this method is disadvantageous in that the tooling electrode as well as the workpiece are consumed due to the electrolytic elution, and in addition to this, reduction in the time for finishing work and further improvement in the surface of workpieces to be finished thereby are required.

SUMMARY OF THE INVENTION

The present invention has been made in view of the above-mentioned circumstances, and has for its object to provide a method of electrolytically machining the surface of a workpiece using a pulsed electric current so that machined surface which is excellent in glossiness and surface roughness can be obtained, and an apparatus for attaining the method.

Another object of the present invention is to provide a method of electrolytically machining the surface of a workpiece using a pulsed electric current wherein the percentage of negative electric current pulses in the whole electric current pulse supply time is reduced so that the consumption of the electrode can be restrained and also an apparatus for attaining the method.

A further object of the present invention is to provide an electrolytic machining apparatus wherein electrolytic machining of the surface of a workpiece can be conducted readily and surely under the control of a concentrated control system over a workpiece fixing device, a tooling electrode supporting device, a power supply means and an electrolyte supply device.

To achieve the above-mentioned objects, according to a first aspect of the present invention, there is provided a method of electrolytically machining the surface of a workpiece by applying positive and negative electric current pulses alternately and repeatedly across the workpiece and a tooling electrode located in opposed relationship in a neutral electrolyte in such a way as to keep a predetermined gap therebetween, characterized in that the time interval from a negative electric pulse to a positive electric current pulse is shorter than that from the positive electric current pulse to the next negative electric current pulse.

To achieve the above-mentioned objects, according to a second aspect of the present invention, there is provided a method of electrolytically machining the surface of a workpiece using a pulsed electric current as set forth in the above-mentioned first aspect wherein the time interval from the negative electric current pulse to the positive electric current pulse is set at zero.

To achieve the above-mentioned objects, according to a third aspect of the present invention, there is provided a method of electrolytically machining the surface of a workpiece using a pulsed electric current as set forth in the above-mentioned first aspect wherein the electrolyte is forcibly caused to flow into the gap between the workpiece and the tooling electrode in the time interval from the positive electric current pulse to the negative electric current pulse, and the electrolyte is caused to become stationary in the time interval from the negative electric current pulse to the next positive electric current pulse.

To achieve the above-mentioned objects, according to a fourth aspect of the present invention, there is provided a method of electrolytically machining the surface of a workpiece using a pulsed electric current as set forth in the above-mentioned first aspect wherein the negative pulse width is smaller than the positive pulse width.

To achieve the above-mentioned objects, according to a fifth aspect of the present invention, there is provided a method of electrolytically machining the surface of a workpiece using a pulsed electric current as set forth in the above-mentioned first aspect wherein each of the positive and negative pulse widths is set in the range of 0.3 to 10 ms, the electric current density is set in the range of 50 to 100 A/cm$^2$, and the gap is set in the range of 0.03 to 2.5 mm.

To achieve the above-mentioned objects, according to a sixth aspect of the present invention, according to a sixth aspect of the present invention, there is provided an apparatus for electrolytically machining the surface of a workpiece using a pulsed electric current comprising: a workpiece fixing device for supporting the workpiece in an electrolytic machining tank; a tooling electrode supporting device capable of locating a tooling electrode whose surface shape is after that of the workpiece to be electrolytically machined in opposed relationship to the surface of the workpiece so as to keep an appropriate gap therebetween; a power supply means for repeatedly applying across the workpiece and the tooling electrode an electric current waveform wherein the polarity thereof is reversed alternately, and the time interval from a negative electric current pulse to a positive electric current pulse is shorter than the time interval from the positive electric current pulse to the next negative electric current pulse; an electrolyte supplying device for supplying an electrolyte into the gap between the workpiece and the tooling electrode; and a concentrated control system for controlling the workpiece fixing device, the tooling electrode supporting device, the power supply means and the electrolyte supplying device.

To achieve the above-mentioned objects, according to a seventh aspect of the present invention, there is provided an apparatus for electrolytically machining the surface of a workpiece using a pulsed electric current as set forth in the above-mentioned sixth aspect, wherein the above-mentioned tooling electrode supporting device is movable towards and away from the workpiece; the above-mentioned electrolyte supplying device can supply the electrolyte intermittently or continuously into the gap between the workpiece and the tooling electrode located in opposed relationship; and the power supply means, the tooling electrode supporting device and the electrolyte supplying are arranged to be actuated in accordance with a working cycle preset by the concentrated control system.

The waveform of electric current pulses to be applied to a workpiece in the prior art electrolytic machining process wherein positive and negative electric current pulses are applied alternately and repeatedly has a pattern as shown in FIG. 1C, whilst the waveform of electric current pulses to be used in the case of the present invention has a pattern as shown in FIG. 1A or FIG. 1B.

Further, the negative pulse width should preferably be less than the positive pulse width. In the case of a punching die, it is only necessary to perform electrolyte machining of a workpiece while supplying the electrolyte to it continuously, whilst in the case of a sinking die having uneven surface, it is preferable to supply a neutral electrolyte forcedly in the time interval from a positive electric current pulse to a negative electric current pulse and cause the electrolyte to become stationary in the time interval from the negative electric current pulse to the next positive electric current pulse.

As the neutral electrolyte to be used in the present invention, in addition to the aforementioned sodium nitrate ($NaNO_3$), it is possible to use $NaCl$, $NaNO_2$, $NaClO_3$, $Na_2CO_3$, $Na_3PO_4$, $Na_2SO_4$, $Na_2B_4O_7$, $KNO_3$, $KNO_2$ or $C_4H_4O_6KNa$ alone or mixture of them as a composite liquid.

Further, as the electrode to be used in the present invention, copper, a copper-tungsten alloy, a silver-tungsten alloy, graphite, brass, iron, etc. may be used, and in order to prevent ions which elute into a neutral electrolyte from causing electrolytic deposition again, any of elements having a higher ionizing tendency than hydrogen or any of elements which are not subjected to electrolysis such as, for example, gold, platinum, aluminium, zinc, tin, lead, nickel, etc. may be used.

The electrolytic finishing is generally subject to the influence of the electric current density, the pulse width and the working gap between the workpiece and the tooling electrode, and therefore these values must be selected properly. A definite reference or standard for selecting these values has not yet been established, however, the following interrelationship is defined generally. Stating in brief, generally speaking, if the gap becomes smaller, then electrical discharge phenomenon takes place at a lower working voltage (across the workpiece and the electrode), and the higher the electric current density, the high the working voltage becomes. Further, if the pulse width becomes higher or the electric current density becomes higher, then the amount of the hydrogen gas, oxygen gas or other electrolytic product generated in the gap between the workpiece and the electrode will increase, thereby increasing the electric resistance in the gap, which increases, in turn, the tendency of occurrence of electrical discharge. Yet further, with increase in the working voltage, even in case no electrical discharge occurs, the pulsed electric current applied across the gap tends to leak to the exterior of the gap whose electric resistance is lower, and as a result, the extent of electrolytic machining is extended to the exterior of the gap by the action of this leakage current (or stray current), thus causing a severe galvanic corrosion, which results in lowering in the surface working accuracy. The smaller the gap between the workpiece and the electrode, and the smaller the amount of the electrolyte existent in the gap, these phenomena becomes more conspicuous. Therefore, to enable a stable working or electrolytic machining to be achieved, it is required (1) to set the electric current density at a lower value, (2) to reduce the pulse width, and (3) to secure a large gap between the workpiece and the electrode. Further, in case more emphasis is placed on the quality of the surface of workpiece to be electrolytically machined than the stability of working, a glossy and smooth machined surface can be obtained readily by conducting the electrolytic machining using a larger current density and a pulse width which falls in a certain range. Judging from this point of view, it is preferable to set each of the positive and negative pulse widths in the range of 0.3 to 10 ms, the electric current density in the range of 50 to 200 A/cm$^2$, the working gap within the range of 0.03 to 2.5 mm.

Further, the negative pulse width should preferably be less than the positive pulse width.

The function and effect of the present invention are as follows.

In case a workpiece of a hard alloy is electrolytically machined, when the workpiece serves as an anode, simultaneously with a chemical reaction wherein Co serving as a binder elutes, the following chemical reaction occurs on the surface of WC or TiC particles.

$$WC \rightarrow WO_3$$

$$TiC \rightarrow TiO_2$$

Whilst, when the workpiece serves as a cathode, an aqueous solution containing NaOH is produced around the cathode (which is the workpiece). At that time, the following chemical reaction occurs in the aqueous solution of NaOH.

$$WO_3 \rightarrow Na_2WO_4$$

$$TiO_2 \rightarrow Ti(OH)_4$$

Then $Na_2WO_4$ or $Ti(OH)_4$ will elute in the electrolyte. In the prior art electrolytic machining process, these two chemical reactions occur separately, while in the case of the electrolytic machining method of the present invention, it is deemed that the above-mentioned two chemical reactions take place at the same time. Stating in brief, in the case of the electrolytic machining method of the present invention, when a positive pulsed electric current is applied across the workpiece and the electrode in the aqueous solution containing NaOH which is produced by applying a negative pulsed electric current, $WO_3$ or $TiO_2$ is produced and Co elutes, and at the same time $WO_3$ will become $Na_2WO_4$ which elutes in the electrolyte, or $TiO_2$ will become $Ti(OH)_4$ which elutes in the electrolyte, and subsequently such chemical reactions take place repeatedly.

As a result of the simultaneous occurrence of elution of WC or TiC and Co, the finished surface of the workpiece becomes smooth and glossy. Further, the layer of $WO_3$ or $TiO_2$ on the surface of the workpiece glows little, so that deposition of the electrolytic product on the surface of the workpiece is restrained.

Whilst, in the case of the prior art electrolytic machining method, since a film of $WO_3$ or $TiO_2$ having a certain thickness is produced, in order to elute the film efficiently into the electrolyte, it is necessary to apply a negative pulsed electric current for a predetermined time so as to maintain a layer of aqueous solution containing NaOH having a predetermined density. In contrast thereto, in the electrolytic machining method of the present invention, since the above-mentioned two chemical reactions occur at the same time, the reactions proceed smoothly and effective reaction of NaOH is obtained, and as a result a small amount of NaOH suffices for the chemical reaction.

Therefore, the negative electric current pulse width can be shortened so as to reduce the percentage of the negative electric current pulses in the whole electric current pulse supply time so that the consumption of the electrode can be restrained.

The present invention having the above-mentioned aspects, functions and effects provides the following advantages.

(1) Since the tendency of deposition of electrolytic products on the workpiece and electrode is limited as compared with the prior art electrolytic machining process, a stable machining can be conducted.

(2) Since excellent surface finish can be obtained by using longer pulse, the time for processing can be curtailed as compared with the prior art electrolytic machining method.

(3) A finished surface excellent in terms of gloss value and surface roughness can be obtained as compared with the prior art method.

(4) Since the percentage of the negative pulsed electric current in the whole pulse electric current supply time can be reduced, the consumption of the electrode can be restrained.

(5) The method of the present invention can be carried out readily and surely under the control of the concentrated control system over the workpiece fixing device, the tooling electrode supporting device, the power supply means and the electrolyte supplying device.

The above-mentioned and other objects, aspects and advantages of the present invention will become apparent to those skilled in the art by making reference to the following detailed description and the accompanying drawings in which preferred embodiments incorporating the principles of the present invention are shown by way of example only.

BRIEF DESCRIPTION OF THE DRAWINGS

FIGS. 1A and 1B are explanatory view showing two kinds of pulse waveforms used for carrying out the present invention;

FIG. 1C is an explanatory view showing a pulse waveform for use in the prior art electrolytic machining method;

FIG. 3 shows a pulse waveform used in EXAMPLE 1 of the present invention; FIG. 4 shows a pulse waveform used in COMPARATIVE EXAMPLE 1; FIG. 5 shows a pulse waveform used in EXAMPLE 2; FIG. 6 shows a pulse waveform used in EXAMPLE 3; FIG. 7 shows a pulse waveform used in EXAMPLES 4 and 5; and FIG. 8 shows a pulse waveform used in COMPARATIVE EXAMPLE 2;

DETAILED DESCRIPTION OF THE INVENTION

The present invention will now be described below by way of several examples and comparative examples with reference to the accompanying drawings.

EXAMPLE 1

Figure 2:
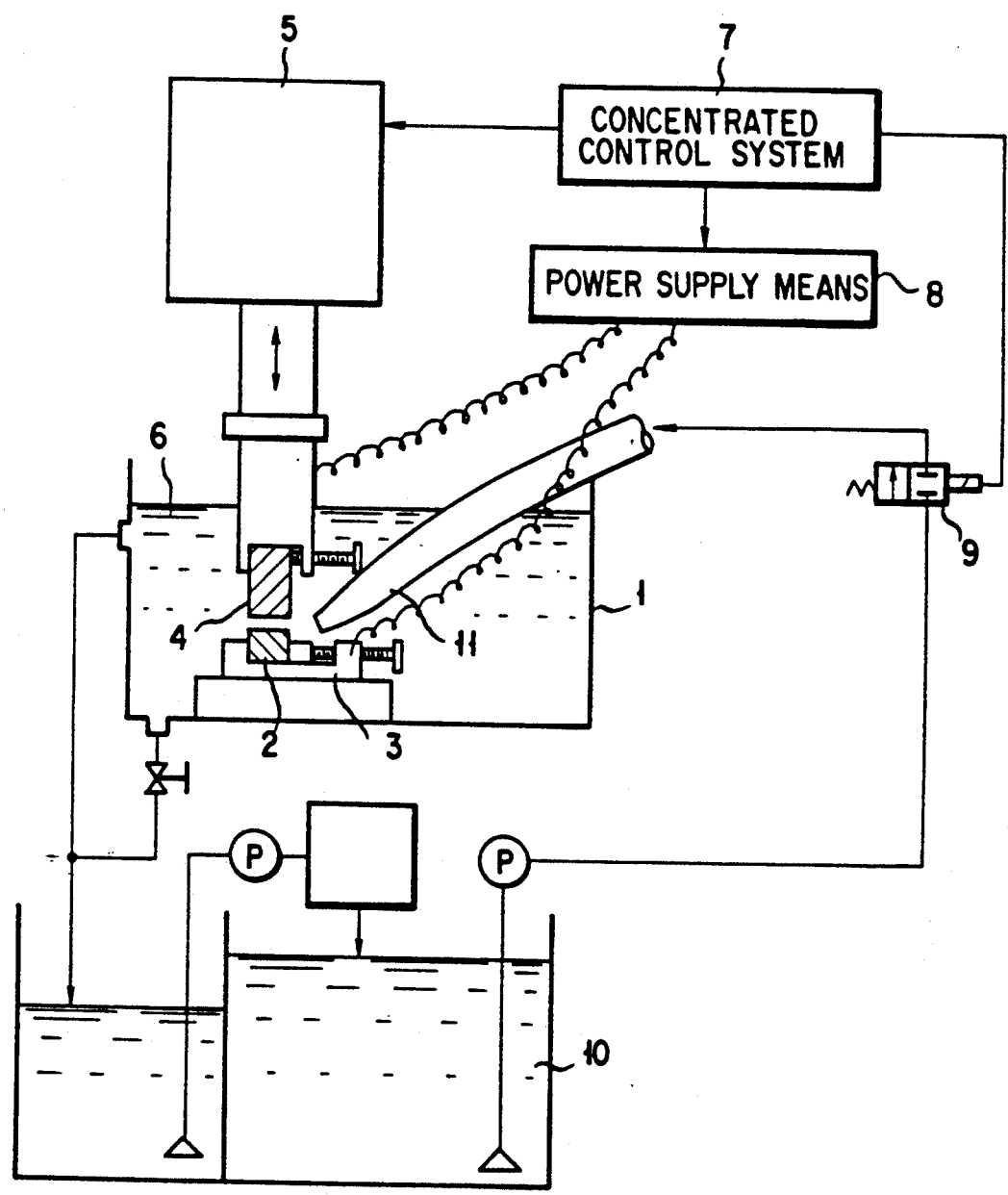
FIG. 2 is an explanatory view showing one embodiment of an apparatus suitable for carrying out the electrolytic machining method of the present invention.
Figure 3:
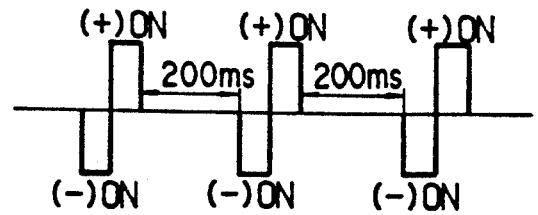
FIGS. 3 to 8 are explanatory views showing various kinds of pulse waveforms.

As shown in FIG. 2, a workpiece 2 (10 mmW×5 mmH) was fixedly secured onto a fixing device 3 within an electrolytic machining tank 1, and a tooling electrode 4 made of SKS3 having the same dimensions as the workpiece 2 was fixedly secured to an electrode supporting device 5. Subsequently, the tooling electrode 4 was lowered to keep a clearance (which is referred to as "gap" hereinbelow) of 50 μm between the electrode 4 and the workpiece 2 located in opposed relationship. After that, an aqueous solution containing 40% by weight of NaNO$_3$ was poured into the electrolytic machining tank 1 as an electrolyte 6 so that the workpiece 2 and the tooling electrode 4 were immersed in the electrolyte 6. After such preparation was made, a concentrated control system 7 was started. The concentrated control system 7 functioned to send an instruction signal to a power supply means 8, which then generated electric current pulses having a waveform as shown in FIG. 3 and applied it across the tooling electrode 4 and the workpiece 2, and open a solenoid-actuated value 9 at the same time to supply continuously the electrolyte 6 from an electrolyte tank 10 through an electrolyte injection nozzle 11 between the tooling electrode 4 and the workpiece 2 at a temperature of 25° C. and at a pressure of 0.8 kg/cm$^2$.

COMPARATIVE EXAMPLE 1

Figure 4:
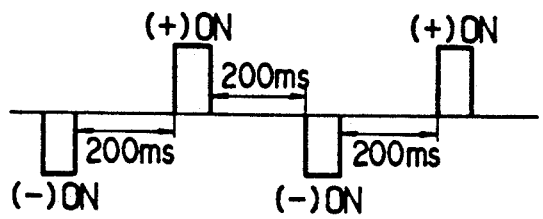

A workpiece was electrolytically machined under the same working condition, except that a pulse waveform as shown in FIG. 4 was applied.

Experimental results obtained by varying the positive and negative pulse widths in the above-mentioned EXAMPLE 1 and COMPARATIVE EXAMPLE 1 are collectively shown in TABLE 1. In each column of TABLE 1, symbols on the left side show the experimental result of EXAMPLE 1, whilst those on the right side show the experimental result of COMPARATIVE EXAMPLE 1, symbols indicated in the three columns, i.e., the upper, middle and lower columns on each side shall be defined as follows.

TABLE 1

| SCOPE OF EXPERIMENT AND RESULT OBTAINED BY USING POSITIVE PULSE WIDTH OF 0.5 ms | | | | |
|---|---|---|---|---|
| NEGATIVE PULSE WIDTH | | 0.35 ms | | |
| | | ○ | x | |
| | | ○ | Δ | |
| | | ○ | x | |

| SCOPE OF EXPERIMENT AND RESULT OBTAINED BY USING POSITIVE PULSE WIDTH OF 1.0 ms | | | | | | | |
|---|---|---|---|---|---|---|---|
| NEGATIVE PULSE WIDTH | 0.35 ms | | 0.50 ms | | 0.70 ms | | 1.00 ms |
| x | x | ○ | x | ○ | x | ○ | ○ |
| Δ | x | Δ | Δ | Δ | Δ | Δ | Δ |
| x | x | ○ | x | ○ | x | ○ | x |

| SCOPE OF EXPERIMENT AND RESULT OBTAINED BY USING POSITIVE PULSE WIDTH OF 2.0 ms | | | | | |
|---|---|---|---|---|---|
| NEGATIVE PULSE WIDTH | 0.70 ms | | 1.00 ms | | 1.40 ms |
| x | x | ○ | x | ○ | ○ |
| x | Δ | ○ | Δ | ⊙ | Δ |
| ○ | ○ | ○ | Δ | ○ | Δ |

TABLE 1-continued

| SCOPE OF EXPERIMENT AND RESULT OBTAINED BY USING POSITIVE PULSE WIDTH OF 3.0 ms | |
|---|---|
| NEGATIVE PULSE WIDTH | 2.10 ms |
| ○ | ○ |
| ○ | Δ |
| ○ | ○ |

Upper column: Deposition of electrolytic product
○ ... Nil
x ... Deposited or anchored
Middle column: Gloss of finished surface
⊙ ... Silver
○ ... Silver grey
Δ ... Electrolytic machined surface of workpiece was uneven or dark grey
x ... Unable to apply electrolytic machining process
Lower column: Property of tooling electrode
○ ... glossy surface
Δ ... brown
x ... rough surface

EXAMPLE 2

Figure 5:
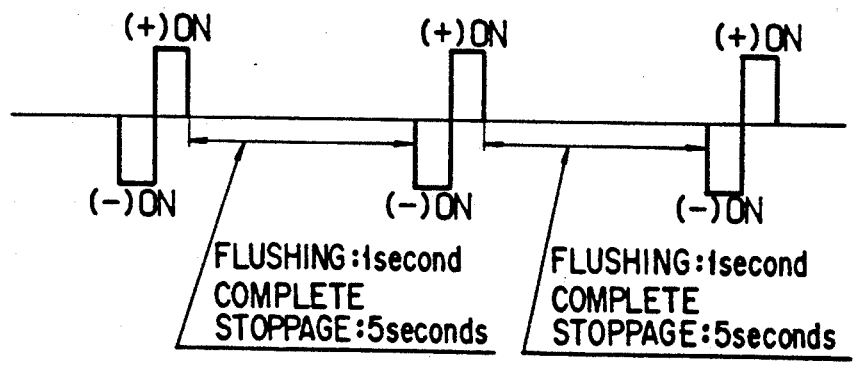

A workpiece was electrolytically machined using a pulse waveform as shown in FIG. 5 under the following working condition. Further, the wording "flushing" means supply of the electrolyte through the electrolyte injection nozzle at a temperature of 25° C. and at a pressure of 0.8 kg/cm$^2$ after application of positive pulsed electric current, and the wording "whole rest" means a condition wherein the supply of the electrolyte through the electrolyte injection nozzle is interrupted and a pulsed electric current is applied when the electrolyte becomes stationary after the flushing.

| | |
|---|---|
| Material of workpiece: | YD 15 (hard alloy) |
| Dimension of workpiece: | 10$^W$ × 5$^h$ mm |
| Tooling electrode: | SK S3 |
| Electrolyte: | Aqueous solution containing 40% by weight of NaNO$_3$ |
| Working gap: | 50 μm |
| Electric current density: | 50 A/cm$^2$ |
| Quantity of electricity turned on: | 160 C/cm$^2$ |

EXAMPLE 3

Figure 6:
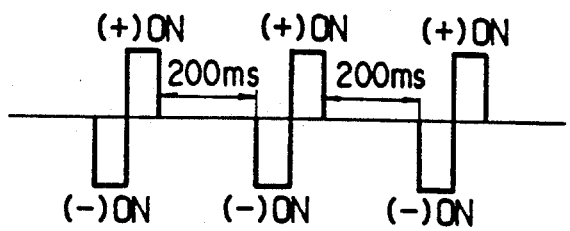

Electrolytic machining of a workpiece was conducted using a pulse waveform as shown in FIG. 6 under the same working condition as EXAMPLE 2. In this EXAMPLE, however, the electrolyte was continuously supplied at a temperature of 25° C. and at a pressure of 0.8 kg/cm$^2$.

Experimental results of EXAMPLES 2 and 3 are indicated in TABLE 2. In TABLE 2, symbols on the left side of each column show the results of EXAMPLE 2, whilst those on the right side of each column show the results of EXAMPLE 3.

TABLE 2

| SCOPE OF EXPERIMENT AND RESULT OBTAINED BY USING POSITIVE PULSE WIDTH OF 4.0 ms | | | |
|---|---|---|---|
| NEGATIVE PULSE WIDTH (ms) | 2.8 | 3.0 | 4.0 |
| | — x | — ○ | — ○ |
| | — Δ | — ○ | — Δ |
| | — x | — ○ | — ○ |

| SCOPE OF EXPERIMENT AND RESULT OBTAINED BY USING POSITIVE PULSE WIDTH OF 8.0 ms | | | | | |
|---|---|---|---|---|---|
| NEGATIVE PULSE WIDTH (ms) | 2.0 | 2.5 | 2.8 | 3.0 | 4.0 |
| ○ | — ○ | — ○ | — ○ | — — | ○ |

TABLE 2-continued

| | | | | | | |
|---|---|---|---|---|---|---|
| Δ | — | ○ | — | ○ | — | ○ | — | — | ○ |
| Δ | — | Δ | — | Δ | — | Δ | — | — | x |
| 5.0 | 5.6 | 6.0 | 7.0 | 8.0 | 10.0 | |
| — ○ | ○ ○ | ○ ○ | — ○ | ○ ○ | — ○ | |
| — ○ | ○ ○ | ○ ○ | — ○ | ○ ○ | — ○ | |
| — x | Δ ○ | x ○ | — ○ | Δ ○ | — ○ | |

SCOPE OF EXPERIMENT AND RESULT OBTAINED
BY USING POSITIVE PULSE WIDTH OF 10.0 ms

| NEGATIVE PULSE WIDTH (ms) | 3.0 |
|---|---|
| | ○ — |
| | ○ — |
| | Δ — |

-continued

| Electrolyte: | Aqueous solution containing 40% by weight of NaNO$_3$, which was supplied at a temperature of 25° C. and a pressure of 1 kg/cm$^2$ during flushing. |
|---|---|

COMPARATIVE EXAMPLE 2

Figure 8:
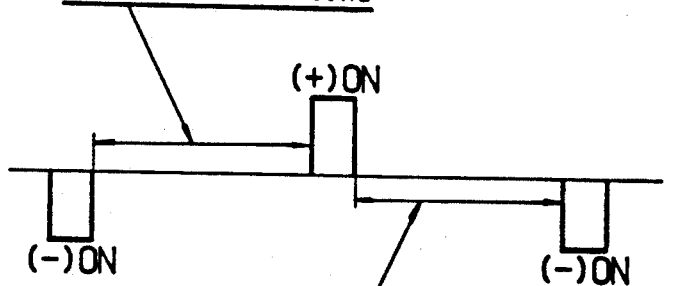

A workpiece was electrolytically machined using a pulse waveform as shown in FIG. 8 under the same working condition as EXAMPLES 4 and 5.

The working gap and other numerical values in EXAMPLES 4 and 5 and COMPARATIVE EXAMPLE 2 are indicated in TABLE 3.

| | Working gap (μm) | Electric current A/cm$^2$ density | | Time interval between negative and positive pulses a (ms) | Negative pulse width (ms) | positive pulse width (ms) |
|---|---|---|---|---|---|---|
| | | Negative pulse | Positive pulse | | | |
| Example 4 | 200 | 90 | 90 | 5.0 | 1.4 | 2.0 |
| Example 5 | 200 | 100 | 100 | 0.36 | 0.7 | 1.0 |
| Comparative Example 2 | 200 | 94 | 94 | 1000 | 1.4 | 2.0 |

EXAMPLES 4 AND 5

Figure 7:
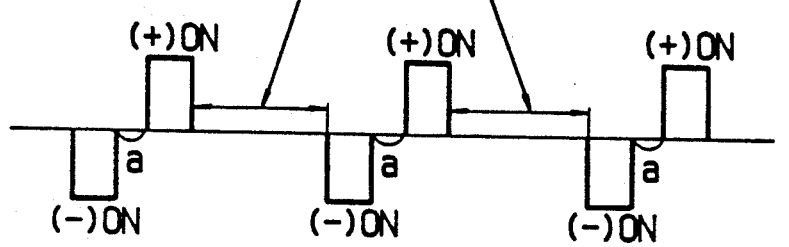

Electrolytic machining of workpieces were conducted using a pulse waveform as shown in FIG. 7 under the following working condition.

| Material of workpiece: | YD 15 (hard metal) |
|---|---|
| Dimension of workpiece: | 10$^W$ × 5$^H$ mm |
| Material of electrode: | graphite (Gr) |

Figure 9:
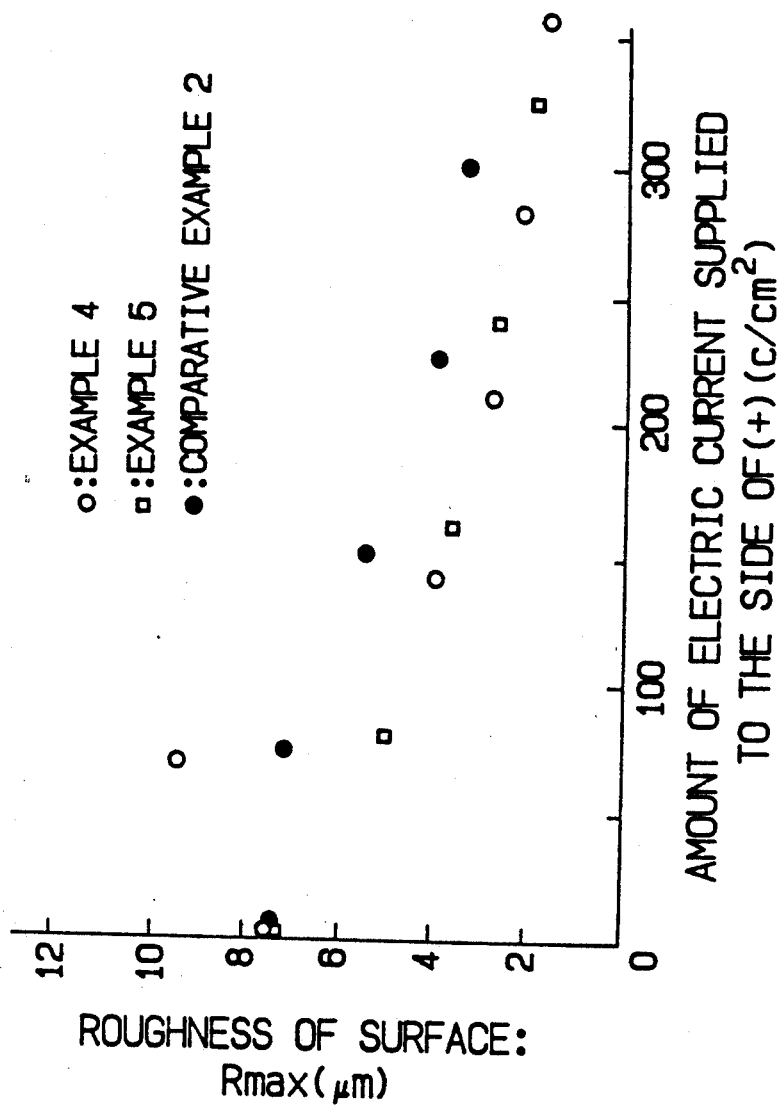
FIG. 9 is a graph showing the relationship between the quantity of electricity turned on and the surface roughness of a workpiece in EXAMPLES 4, 5 and 6 and COMPARATIVE EXAMPLE 2.
Figure 10:
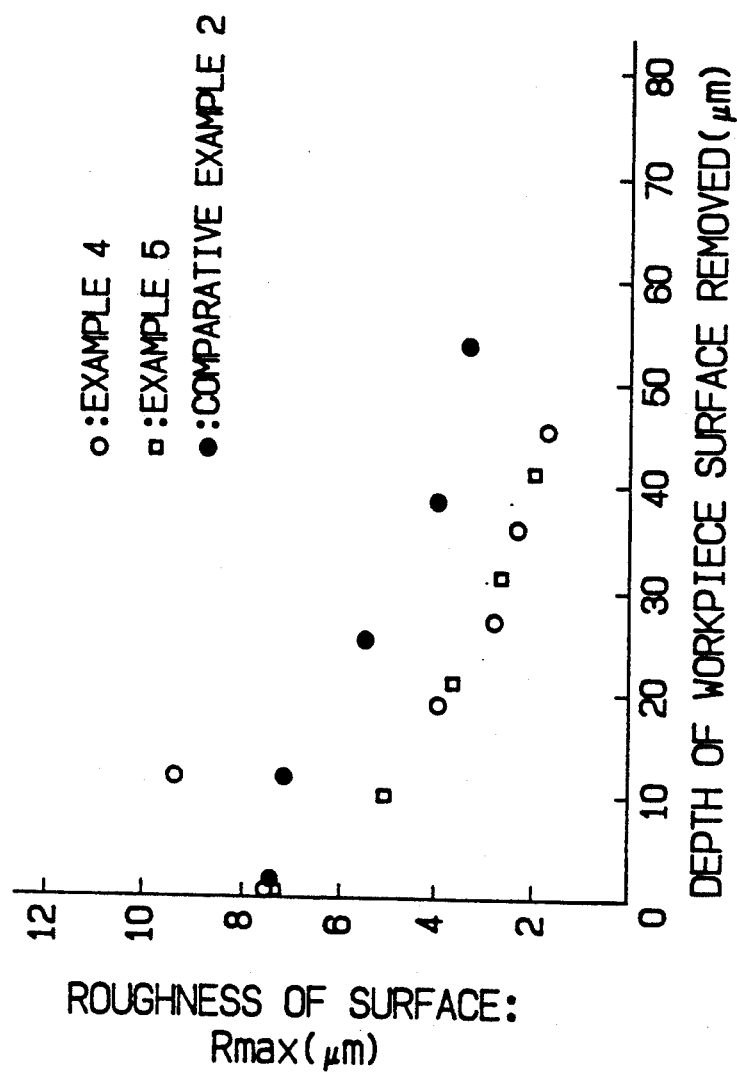
FIG. 10 is a graph showing the relationship between the surface roughness and the depth of the surface of workpiece removed.

The relationship between the quantity of electricity turned on (actual electric current density × time during which electricity turned on) and the surface roughness is shown in FIG. 9, and the relationship between the surface roughness and the depth of the surface of the workpiece removed is shown is FIG. 10.

Next, excellent experimental result obtained by properly selecting the working gap, electric current density and pulse width are shown in TABLE 4 as EXAMPLE 6.

TABLE 4

Figure 11:
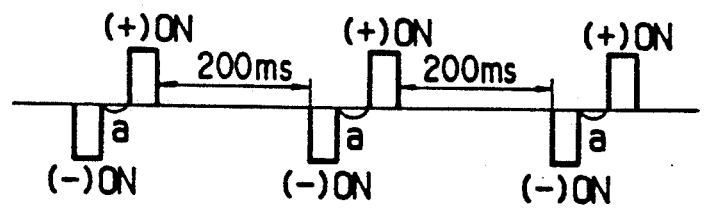
FIG. 11 is an explanatory view showing a pulse waveform used in EXAMPLE 6 of the present invention.

| Gap (μm) | Electric current density (A/cm$^2$) | | Pulsed electric current supply time (ms) | | a (ms) | Material of tooling electrode and working condition | | Working cycle |
|---|---|---|---|---|---|---|---|---|
| | Negative pulse | Positive pulse | Negative pulse | Positive pulse | | Gr | Steel | |
| 30 | 100 | 100 | 1.4 | 2.0 | 0 | ○ ○ ○ | | FIG. 11 |
| 2000 | 128 | 128 | 0.7 | 1.0 | 5 | ○ ⊙ ○ | | FIG. 7 |
| 2500 | 120 | 124 | 0.7 | 1.0 | 5 | ○ ○ ○ | | FIG. 7 |
| 2500 | 124 | 132 | 0.7 | 1.0 | 5 | ○ ○ ○ | | FIG. 7 |
| 50 | 50 | 50 | 0.35 | 0.5 | 0 | | ○ ○ ○ | FIG. 11 |
| 50 | 50 | 50 | 10.0 | 8.0 | 0 | | ○ ○ ○ | FIG. 11 |
| 50 | 50 | 50 | 10.0 | 10.0 | 0 | | ○ ○ Δ | FIG. 7 |
| 1000 | 152 | 156 | 0.7 | 1.0 | 5 | ○ ⊙ ○ | | FIG. 7 |
| 1000 | 172 | 176 | 0.7 | 1.0 | 5 | ○ ○ ○ | | FIG. 7 |
| 2000 | 168 | 188 | 0.5 | 0.8 | 3 | ○ Δ | | FIG. 11 |

TABLE 4-continued

| Gap (μm) | Electric current density (A/cm²) | | Pulsed electric current supply time (ms) | | a (ms) | Material of tooling electrode and working condition | | Working cycle |
|---|---|---|---|---|---|---|---|---|
| | Negative pulse | Positive pulse | Negative pulse | Positive pulse | | Gr | Steel | |
| | | | | | | ○ | | |

(NOTE) DEFINITION OF SYMBOLS INDICATING WORKING CONDITION
Upper Column: Deposition of electrolytic product
○ ... electrolytic product was not deposited on the workpiece
Middle Column: Colour (gloss) of finished surface of workpiece
◉ ... silver
○ ... silver grey or silver grey mixed with silver
▲ ... dark grey mixed with other colours
Lower Column: Condition of surface of tooling electrode
○ ... glossy surface or no change
▲ ... brown surface The above result proved that the electric current density should generally be set within the range of 50 to 200 A/cm², the pulse width should generally be set within the range of 0.3 to 10 ms, and the working gap should generally be set within the range of 0.03 to 2.5 ms.

COMPARATIVE EXAMPLE 3

Figure 12:
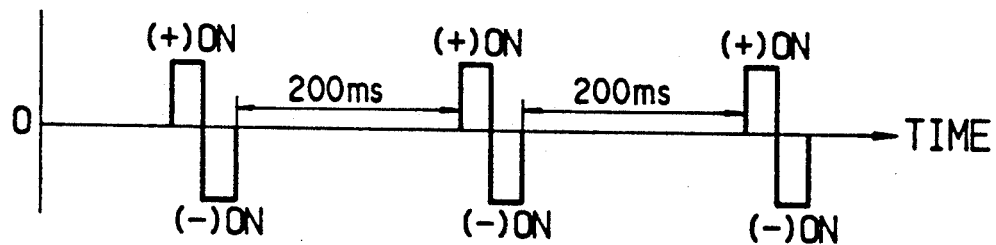
FIG. 12 is an explanatory view showing a pulse waveform used in COMPARATIVE EXAMPLE 3.

A workpiece was electrolytically machined using a pulse waveform as shown in FIG. 12 in which the sequence of application of positive and negative electric current pulses is reversed, and also under the following working condition.

| | |
|---|---|
| Material of workpiece: | YD 15 (hard metal) |
| Dimension of workpiece: | $10^W \times 5^H$ mm |
| Tooling electrode: | SK S3 |
| Working gap: | 50 μm |
| Electric current density: | 100 A/cm² |
| Electrolyte: | An aqueous solution containing 40% by weight of NaNO₃ was supplied continuously. |

In this example, ill effects were conspicuous, for example, the working gap was liable to be filled with electrolytic product, resulting in failure to obtain glossy workpiece surface, and therefore excellent result was not obtained as compared with the prior art methods.

Figure 13:
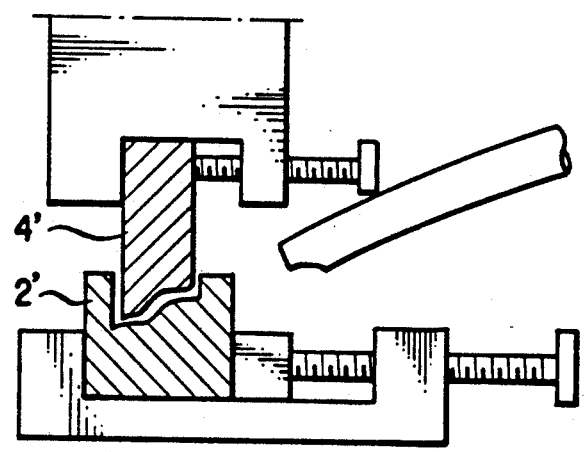
FIGS. 13 and 14 are views for explaining the operations to be made when the electrolytic machining method of the present invention is applied to a workpiece having uneven surface.
Figure 14:
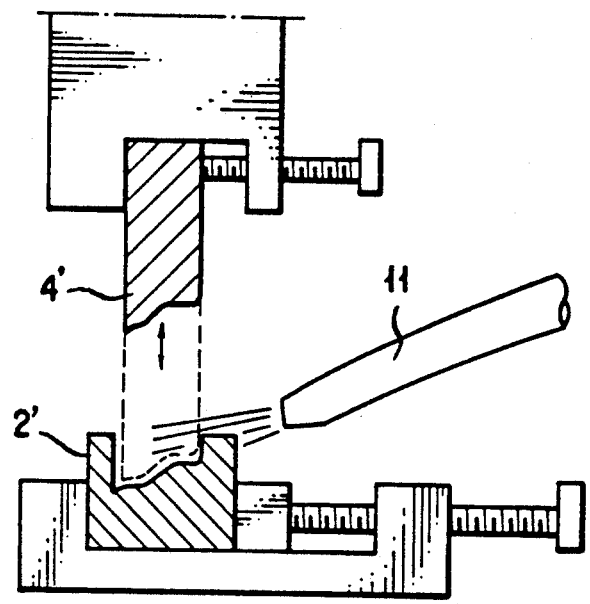

While workpieces having flat surfaces to be electrolytically machined were used in the above-mentioned examples, the present invention can be applied likewise to a workpiece 2' having uneven surface similar to engraved surface as shown in FIG. 2. In this case, while electric current pulses were applied across a tooling electrode 4' and the workpiece 2', the tooling electrode 4' is moved towards the workpiece 2' until a predetermined gap is obtained between them as shown in FIG. 13. However, when the electrolyte is flushed through the electrolyte injection nozzle 11 as shown in FIG. 14, it is preferable to keep the tooling electrode 4' away widely from the workpiece 2' so as to prevent an electrolytic product from residing in between uneven portions.

It is to be understood that the foregoing description is merely illustrative of preferred embodiments of the present invention, and that the scope of the invention is not to be limited thereto, but is to be determined by the scope of the appended claims.

What is claimed is:

1. A method of electrolytically machining the surface of a workpiece by applying positive and negative electric current pulses alternately and repeatedly across the workpiece and a tooling electrode located in opposed relationship in a neutral electrolyte in such a way as to keep a predetermined gap therebetween, characterized in that the time interval from a negative electric current pulse to a positive electric current pulse is shorter than that from the positive electric current pulse to the next negative electric current pulse, wherein the electrolyte is forcibly caused to flow into the gap between the workpiece and the tooling electrode in the time interval from the positive electric current pulse to the negative electric current pulse, and the electrolyte is caused to become stationary in the time interval from the negative electric current pulse to the next positive electric current pulse.

2. A method of electrolytically machining the surface of a workpiece by applying positive and negative electric current pulses alternately and repeatedly across the workpiece and a tooling electrode located in opposed relationship in a neutral electrolyte in such a way as keep a predetermined gap therebetween, characterized in that the time interval from a negative electric current pulse to a positive electric current pulse is shorter than that from the positive electric current pulse to the next negative electric current pulse, wherein each of the positive and negative pulse widths is set in the range of 0.3 to 10 ms, the electric current density is set in the range of 50 to 200 A/cm², and the gap is set in the range of 0.03 to 2.5 mm.

* * * * *